United States Patent [19]

Asberg et al.

[11] 3,733,648
[45] May 22, 1973

[54] BEARING ASSEMBLY FOR A SWIVEL CASTOR

[75] Inventors: Sture Lennart Asberg, Savedalen, Sweden; Hendrikus Jacobus Maria Timmer, Ede, Netherlands

[73] Assignee: SKF Industrial Trading and Development Company N.V., Amsterdam, Netherlands

[22] Filed: June 10, 1971

[21] Appl. No.: 151,839

[30] Foreign Application Priority Data

June 10, 1970 Netherlands ....................... 7008444

[52] U.S. Cl. .................................................. 16/21
[51] Int. Cl. ........................................... B60b 33/00
[58] Field of Search ........................... 16/18, 21, 26

[56] References Cited

UNITED STATES PATENTS

| 811,152 | 1/1906 | Knipe | 16/21 |
| 1,888,801 | 11/1932 | Herold | 16/21 |
| 1,923,211 | 8/1933 | Jarvis | 16/21 |
| 3,577,620 | 5/1971 | Hoffman | 16/21 |

Primary Examiner—James T. McCall
Assistant Examiner—Doris L. Troutman
Attorney—Howson & Howson

[57] ABSTRACT

A swivel bearing assembly for a swivel castor comprising a housing and a wheel fork, which parts are connected with each other, rotatable about a vertical axis, by means of a ball bearing, the outer ring of said bearing being connected to said housing and the inner ring being connected to the wheel fork, characterized in that the two rings are restrained by deformation, such as folding of the material of housing and fork respectively.

3 Claims, 2 Drawing Figures

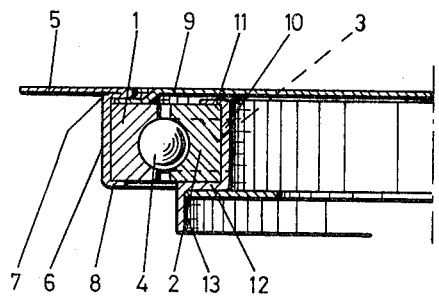
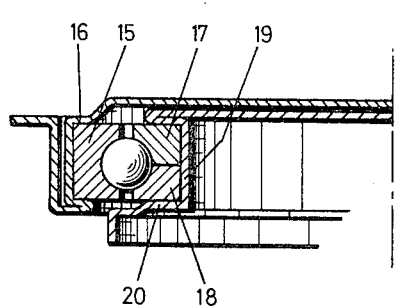

BEARING ASSEMBLY FOR A SWIVEL CASTOR

The invention relates to a bearing assembly for a swivel castor comprising a housing and a wheel fork, said parts, being, rotatable about a vertical axis, connected with each other by means of a ball bearing, the outer ring of said bearing being connected to the housing and the inner ring being connected to the wheel fork. Such a rolling bearing for a swivel castor has been described in the earlier patent application No.68,16233 in this instance sheet metal parts are used for the housing and the fork, to which sheet parts are used for the housing and the fork, to which sheet metal parts inner and outer rings of the bearing are welded, said rings being completely finished prior to the assembly.

The prior known rolling bearings for swivel castors are generally formed by constructions in which the bearing surfaces are formed in the parts of the housing and parts of the fork respectively, said parts being manufactured by forging or pressing, themselves. Such bearing assemblies have no very accurate configuration, however, so that it has already been proposed in the earlier suggestion to use conventional race rings.

It is the object of the present invention to furnish a swivel bearing assembly by using conventional inner and outer rings too preferably three or four point single row ball bearings, which bearing assembly is simple and inexpensive to manufacture. This object is achieved according to the invention by the fact that the two rings are restrained by deformation, such as folding of the material, of housing and fork respectively. Starting from this principle, it is possible for swivel castors to be made in a simple way by using so-called three or four-point single row bearings which take up axial and radial loads, and therefore have a long life. In this arrangement it is possible to position a previously entirely assembled bearing in pre-formed voids of housing and fork, subsequently to restrain said bearing by deforming a few parts. It is also possible to position the outer ring in the housing separately and to position and restrain the inner ring in the fork separately, and subsequently to feed the balls via a filling hole. The filling hole should in that case be in the unloaded zone of the rotating part. It is also possible to do without a filling hole by dividing at least one of the rings in two parts according to a plane of division perpendicularly to the axis of rotation. During the assembling process the complete outer ring may be put in position, for instance, as well as half the inner ring, the entire space then being filled with balls. Subsequently the second half of the inner ring is put in position and restrained by deforming. As compared with the former possibility the latter possibility has the advantage that there is no need of a filling opening, while it is still possible to use an entirely filled bearing, that is a bearing without separating cage.

Both housing and wheel fork will usually consist of rolled sheet metal. It will be clear, however, that plastics may be used as well, such as thermoplastic materials, which may be pressed around the rings by heating and deformation in order to restrain said rings.

The invention will now be elucidated further with reference to the drawings.

FIG. 1 shows diagrammatically and in cross-section a single embodiment of the present invention.

FIG. 2 shows other embodiments of inner and outer ring according to the invention in a similar way.

The construction shown in FIG. 1 comprises an outer ring 1 and an inner ring 2. The inner ring is provided with a filling opening 3 for the balls 4.

The housing for the outer ring consists of a deep drawn sheet of sheet metal with a flange 5 and a ring 6, a fold being formed between flange and ring at 7, while the end face of the ring is deflected inwards at 8. Retaining the outer ring 1 may be effected either by the formation of the fold 7 or by the deformation 8. In making this housing of sheet metal, the arrangement may be such that after deep drawing to form the ring 6 the bottom is punched out of the recessed part, the disc thus obtained is used in the construction again as upper closure 9 either by restraining the edge thereof under the fold 7, between said fold and the inner ring 1, or by welding the edge thereof to the flange 5.

The inner ring 2 is enclosed within the ring 10 which is formed of sheet metal and has folded edges 11 and 12 with a flange 13.

In the embodiment of FIG. 2 the outer ring 15 is restrained in a housing 16 formed of sheet metal.

In the construction the inner ring consists of two parts 17 and 18. During the assembling the part of the fork 19 which has to take up the inner ring has been given a cylindrical shape and only the upper half 17 is placed therein. Subsequently the inner and outer ring are positioned together, the space is filled with balls, subsequently the second half of the inner ring 18 is placed in position, and then the lower end of the cylindrical part 19 is pressed into the position 20, indicated with dotted lines, in order to restrain the ring.

It will be obvious that in using a housing according to the embodiment of FIG. 1 and a part of a fork for the inner ring corresponding with FIG. 2, between those parts a bearing which has been mounted prior to the assembly with inner ring, outer ring, balls and cage may be positioned, because it is sufficient for the restraint of such a bearing t4 mould the lower edges of the annular parts of housing and forked part around the rings. Such a bearing is not completely filled with balls, however.

Preferably both race rings are divided in two parts according to a plane of division perpendicular to the axis.

We claim:

1. A swivel bearing assembly for a swivel castor comprising inner and outer rings spaced apart to define an annular space for a plurality of rolling elements, a first one-piece housing of a deformable material for the outer ring of generally U-shaped configuration consisting of an annular portion confronting the outer surface of the outer ring and a pair of radially inwardly directed flanges, one of said flanges reversely folded on itself, and a radially outwardly directed flange coextensive with one of said radially inwardly directed flanges and a second one-piece housing of a deformable material for the inner ring consisting of cylindrical portion confronting the inner surface of the inner ring and a pair of radially outwardly directed second flanges confronting axial ends of the inner ring, one of said second flanges being reversely folded on itself.

2. A rolling bearing assembly for a swivel wheel according to claim 1, characterized in that at least one of the rings is divided in two parts according to a plane of division perpendicular to the axis of rotation.

3. A swivel bearing assembly as claimed in claim 1 wherein the housings are made of sheet metal.

* * * * *